United States Patent
Vitarelli

Patent Number: 5,292,142
Date of Patent: Mar. 8, 1994

[54] SIDECAR FOR BICYCLE

[76] Inventor: Art Vitarelli, 316 La Jolla Dr., Newport Beach, Calif. 92663

[21] Appl. No.: 721,833

[22] Filed: Jun. 26, 1991

[51] Int. Cl.$^5$ .............................................. B62K 27/12
[52] U.S. Cl. .................................. 280/203; 280/202; 280/292
[58] Field of Search .............................. 280/203–204, 280/473, 202, 292; 296/36

[56] References Cited

U.S. PATENT DOCUMENTS

| | | | |
|---|---|---|---|
| 1,824,675 | 9/1931 | Linn . | |
| 2,485,994 | 10/1949 | Warner | 280/203 |
| 2,537,258 | 1/1951 | Braun, Jr. | 280/203 |
| 3,186,732 | 6/1965 | Mohs | 280/203 |
| 3,704,899 | 12/1972 | Clem, II | 280/203 |
| 3,993,321 | 11/1976 | Cote | 280/204 |
| 4,078,815 | 3/1978 | Vetter . | |
| 4,229,018 | 10/1980 | Chika . | |
| 4,378,121 | 3/1983 | Rans . | |
| 5,020,814 | 6/1991 | George et al. | 280/204 |
| 5,054,800 | 10/1991 | Christensen et al. | 280/204 |

*Primary Examiner*—Margaret A. Focarino
*Assistant Examiner*—Carla Mattix

[57] ABSTRACT

A sidecar for a bicycle comprised of an accessory rear mounting frame, four elongated mounting members an attachment for sidecar wheel and a framework for supporting a load. The accessory rear mounting frame extends from the rear axle of the bicycle to the seat post or the seat tube of the bicycle. Two elongated mounting members extend from the load supporting frame to the accessory rear mounting frame. Two more elongated mounting members extend from the load supporting frame to the forward structural tubing of the bicycle frame. And an attachment member, on the opposite side of the load supporting frame, and located forward of a line formed by extending the rear axle of the bicycle, comprises a support for an axle for the sidecar wheel. In one preferred embodiment each elongated mounting member and the accessory rear mounting frame has adjustments which allow the sidecar to be attached to various sizes of bicycle frames. Each elongated mounting member has means of attachment for securing those members to the load carrying frame, to each other, to the accessory rear mounting frame and to the bicycle as appropriate. The attachment member for supporting an axle for the sidecar wheel has adjustments to allow for setting the vertical height of the sidecar wheel and for toeing that wheel in or out correctly after the sidecar is attached to the bicycle frame. The load carrying framework itself is comprised of two primary loops of tubing, which may assume various more or less complex configurations depending on what, if any, internal members crisscross the loops, both loops aligned in parallel with connecting struts set perpendicular to the planes of the primary loops and connecting them, all of which sidecar provides a base for lacing, bolting, tying or otherwise attaching loads, or supporting/protective devices for loads.

15 Claims, 7 Drawing Sheets

SIDECAR FOR BICYCLE

BACKGROUND—FIELD OF INVENTION

This invention relates to bicycles, specifically to a sidecar to attach to the bicycle for carrying loads.

BACKGROUND—DISCUSSION OF PRIOR ART

Carrying infants and small children conveniently and safely is a multifaceted problem. Various facets, and combinations of facets of this problem have been addressed by numerous inventions. Heretofore inventions for carrying infants on bicycles have had many disadvantages. Such inventions include carrying seats or slings for carrying a child over the front wheel or handlebars, between the rider's legs, over the rear wheel, in a trailer pulled behind the bicycle, or in a sidecar. These inventions have been uncomfortable for the child, either because the carrying device is rigidly attached to the frame of the bicycle so that the child is jarred by every bump in the road and thrown from side to side by the pedaling effort of the rider, or because the carrying device is in the form of a soft sling that gives the child insufficient support resulting in the child becoming cramped and twisted. Most such inventions position the child so that while the bicycle rider is watching the rode he or she cannot view the child or effectively communicate with the child. Many such inventions place the child in a position where its view is obstructed, eliminating a good bit of the pleasure and learning potential the child might otherwise derive from an outing in a bicycle carrier. Some such devices do not offer reasonable safety for the infant rider. Most such devices do not provide a useable seat for the child when the bicycle is at rest, or adequate storage for the paraphernalia that most parents desire to take with them on an outing with a child.

In the instance of sidecars, which eliminate at least some of the above disadvantages, most prior inventions have been designed for motorcycles, with the problems of riding motorcycles, rather than bicycles, in mind. Those few designed for bicycles have been designed with problems in mind that are only marginally relevant in uses where a sidecar is applicable. Typically the attachments for sidecars which have been designed for motorcycles interfere with the pedaling motions required to operate a bicycle, rendering them useless when attached to bicycles. This defect is found in U.S. Pat. No. 4,078,815 to Vetter (1978) and U.S. Pat. No. 4,229,018 to Chika (1980). Sidecars designed to support very heavy loads or to adjust for highspeed cornering or to absorb road shocks associated with such support and speed make no sense where the strength of the rider limits the ability of the vehicle to carry a load. Some such sidecars incorporate elaborate torsion or other shock absorbing devices which would render them too heavy to be practical for a bicycle. Other approaches to flexibility would render the sidecar too wobbly to be freestanding when not in motion, to be safe for vulnerable cargo, or to support much of a load. This defect is found in U.S. Pat. No. 1,824,675 to Linn (1931) U.S. Pat. No. 3,704,899 to Clem (1972) and U.S. Pat. No. 4,378,121 to Rans (1983). Many of the prior inventions have relied on an offset tricycle (two axle) configuration which is impractical and unsafe because it is highly suseptible to pitch poling even at very low speeds. This defect is found in U.S. Pat. No. 1,824,675 to Linn (1931), U.S. Pat. No. 2,485,944 to Warner (1949), U.S. Pat. No. 2,537,258 to Braun (1951), U.S. Pat. No. 3,186,732 to Mohs (1965) and U.S. Pat. No. 4,378,121 to Rans (1983). None of the prior inventions compensate for the lighter weight frame of a bicycle, so that when they are used with a bicycle, such prior inventions could cause damage to the bicycle frame.

The inventor's first insight was the recognition that, while strong bicycle riders may carry heavy loads, corner at high speed, and thus experience significant and continuous road shock, as a practical matter, when a bicycle is utilized for carrying loads, particularly children, the bicycle is ridden differently, even by the same strong rider, and a whole different set of factors becomes significant to design. The inventor's second insight was the recognition that specialized attachment means were required to allow space for pedaling while still insuring that the stresses of load carrying were transferred only to the strongest portions of the bicycle frame. The inventor's third insight was the recognition that the weight of the sidecar could be reduced, its safety enhanced and its manufacture simplified all by substituting a unified rollcage frame-and-carrying support for the traditional sidecar structure consisting of a frame supporting a carrying device. Heretofore, sidecars supposedly designed for bicycles, if they were workable at all, did not really meet the needs of bicycle riders seeking a convenient, sturdy device for carrying a variety of loads, and were even likely to result in damage to the bicycle frame.

OBJECTS AND ADVANTAGES

The immediate object of the present invention was to permit the inventor to take his young son along with him when he rode his bicycle to the beach. The inventor desired an extremely safe carrier for this precious cargo. He wanted to observe his son while he rode, to be able to talk to him, and to be able to share the same view with him. He wanted a seat for his son when at the beach, and adequate storage for the supplies they would need on their outings.

Accordingly the inventor designed a sidecar for a bicycle: which had a tautly-laced fabric seat that was both light weight and comfortable; which allowed him to view and talk to his passenger continually; which allowed his passenger to see forward; which incorporated significant safety features; which served as a child chair when the bicycle was not being ridden; and which had expandable room for storage. To allow room for pedaling without placing excess stress on the weaker portions of the bicycle frame the inventor designed a unique accessory rear mounting frame and a unique bowed front mounting member for attaching the rollcage frame of the sidecar to a bicycle. In meeting all of these objects the inventor incorporated designs contrary in concept to the accepted wisdom in sidecar design. As a result the inventor has come up with a novel design for a sidecar which is suitable not only for carrying a child, but, in fact, for transporting a wide variety of loads with a bicycle, and which it is extremely efficient and cost effective to manufacture. The primary design elements which account for the novelty of this invention over other bicycle sidecars are:

1. A unique accessory rear mounting frame for connecting the sidecar to the back of the bicycle allows the sidecar to be rigidly attached to the bicycle, enhancing the ability of the sidecar to be freestanding when not in motion, without interfering with pedaling the bicycle or over stressing a bicycle frame not originally designed for such load carrying.

2. A unique bowed front mounting member for connecting the sidecar and the front of the bicycle provides the rigidity required to render the sidecar freestanding when not in motion while permitting the rider to use the complete range of motion necessary for peddling.

3. A unique attachment system for the sidecar wheel which is entirely independent of the rear axle of the bicycle so that the sidecar wheel can be placed forward of the line extending from the rear axle of the bicycle to enhance rideability and safety by preventing pitch poling at normal speeds.

4. A unique approach to sidecar design wherein the framework, which in most sidecar designs would support a sidecar, in the present invention actually is the sidecar, designed to maximize safety and so that loads can be lashed to it, with or without the benefit of additional protective or supporting devices that can also be laced to, suspended from or otherwise attached to the sidecar, rendering it possible to reduce the weight of the sidecar without reducing its load carrying capability, a distinct advantage for a bicycle where total load carrying capability is a function of the strength of the rider, and rendering manufacture both efficient and cost effective.

The inventor had to work against the teachings of the prior art in order to perfect a rideable design for a rigidly attached sidecar since much of the prior art was directed toward providing flexibility in the connections between the bicycle and the sidecar. Instead of accepting this traditional teaching the inventor relied heavily on tests under actual riding conditions. Accordingly, this design is largely built around and dependent on the riding style and skills which the inventor's research revealed to be appropriate when carrying loads in a sidecar. As a result this invention allows room for the full range of motion necessary to pedal the bicycle and protects the bicycle frame from damage while at the same time, because of its unique rollcage-carrier design framework, it reduces the weight of the sidecar without compromising its strength, thus assuring the comfort and safety of the sidecar passenger.

LIST OF REFERENCE NUMERALS

10—primary loops, preferred embodiment
12—connecting strut
14—outside attachment member
16—front elongated mounting member U
17—front elongated mounting member L
18—accessory rear mounting frame, one preferred embodiment
20—rear elongated mounting member U
21—rear elongated mounting member L
22—sidecar wheel
24—bicycle
26—lacing attached to connecting struts
27—lacing for tightening
28—load carrying device (child seat), one preferred embodiment
30—protective device (windscreen), one preferred embodiment, bolted to primary loops
40—welded support of one embodiment of outside attachment member for sidecar wheel
42—wheel support yoke of one embodiment of outside attachment member for sidecar wheel
44—holes for axle of sidecar wheel
46—holes for attachment
48—slots for attachment and vertical adjustment
50—nuts
51—bolts
52—washer for one method of toe-in/toe-out adjustment
54—sleeve for attachment for attachment to bicycle
56—sleeve for attachment for attachment to primary loops
58—sleeve for attachment for attachment to elongated mounting members
60—sleeve for attachment (generic), showing one method for making attachments 54, 56 and 58
62—bored flanges for connecting opposing segments of sleeves for attachment
64—bored flanges for connection to elongated mounting members and seat post attachment strut of accessory rear mounting frame
66—seat post attachment strut of accessory rear mounting frame in one preferred embodiment
68—upper attachment plate of the seat post attachment strut clamp of accessory rear mounting frame in one preferred embodiment
70—axle attachment strut of accessory rear mounting frame in one preferred embodiment
72—bored flanges for connecting to rear elongated mounting members

DESCRIPTION OF INVENTION

Figure 1:
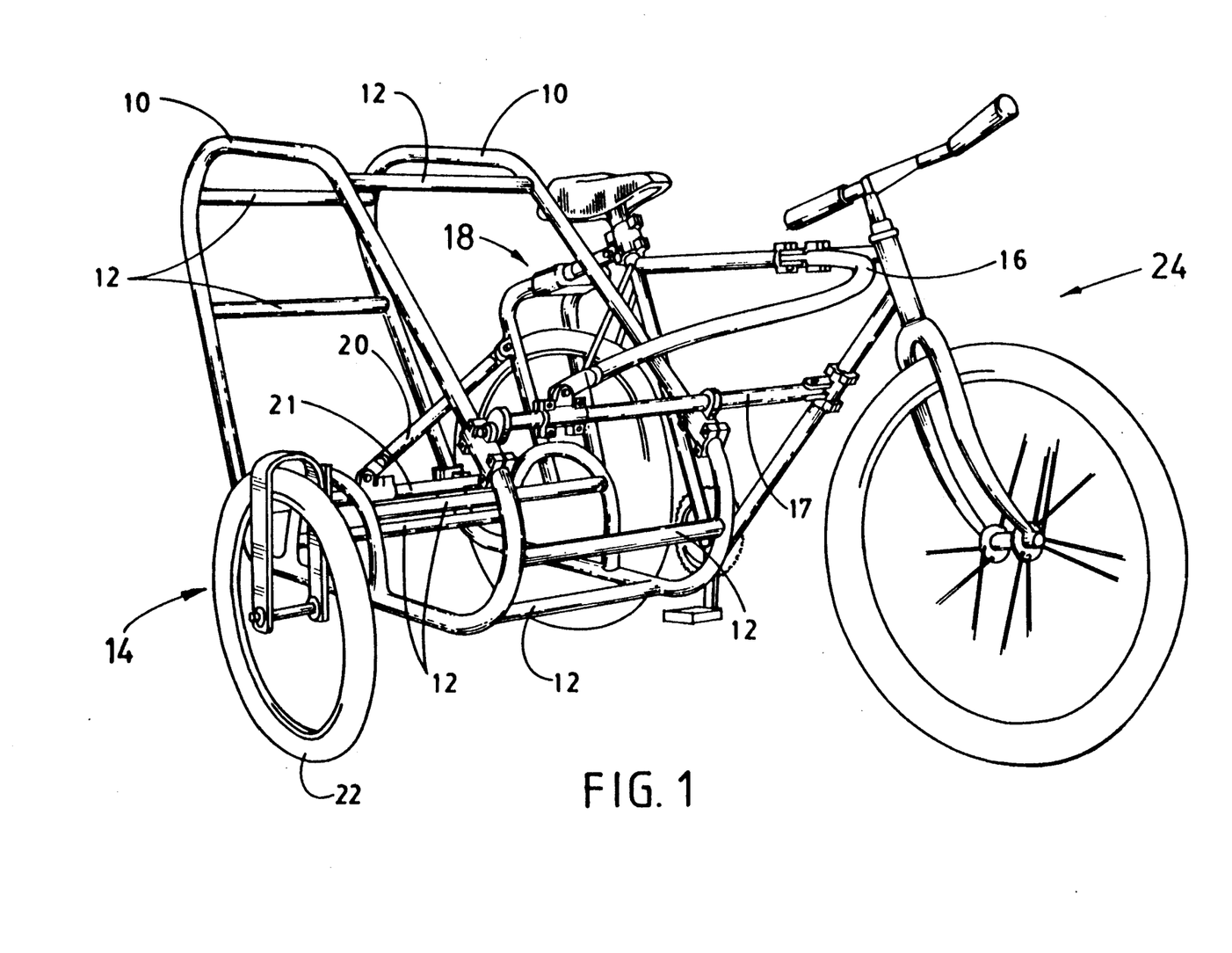
FIG. 1 is a side perspective of the invention showing one preferred embodiment of the accessory rear mounting frame.
Figure 2:
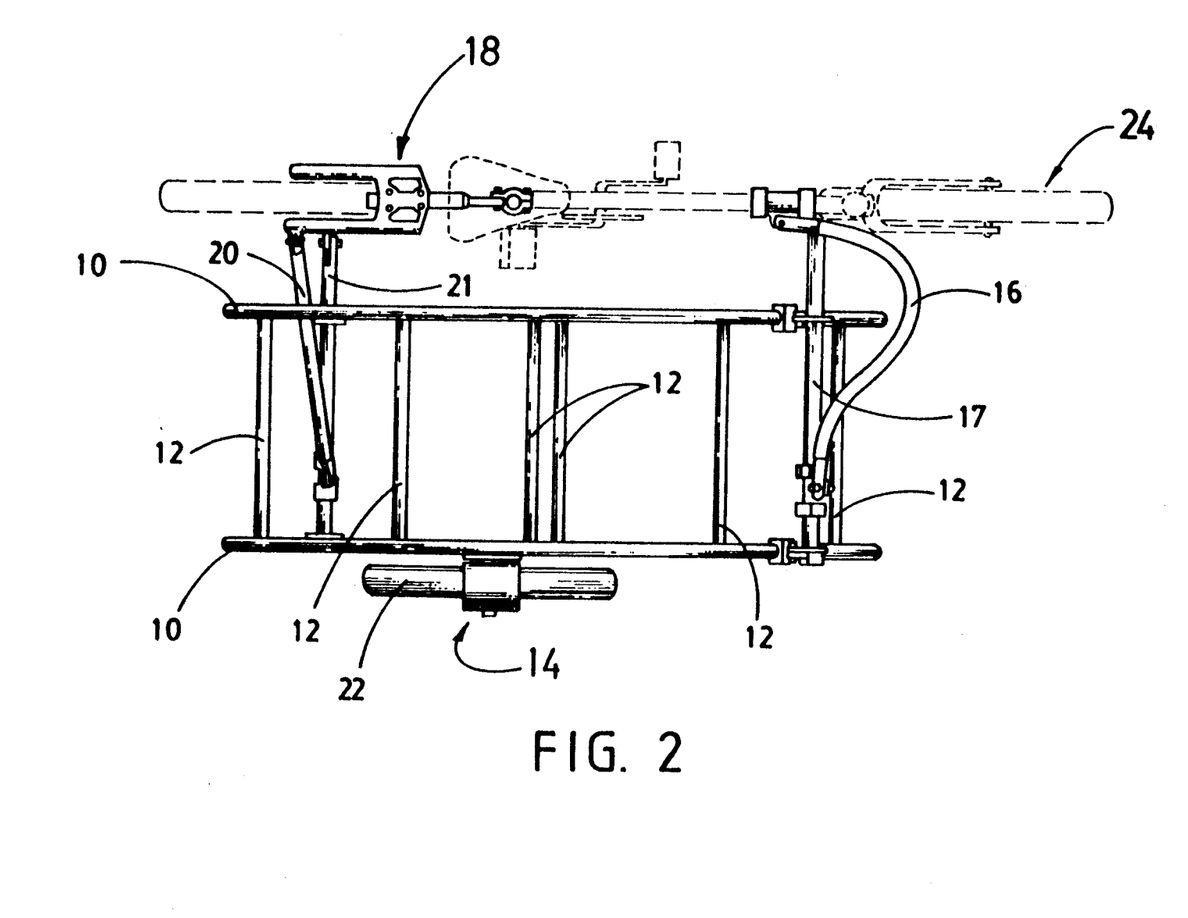
FIG. 2 is a top view of the invention showing one preferred embodiment.

FIGS. 1 and 2 show side and top views, respectively, of one preferred embodiment of the invention. The rollcage frame of the invention is comprised of two primary loops (10) which may be formed from PVC piping, steel or aluminum tubing, etc. Each primary loop (10) may assume a more or less complex configuration depending upon how and whether internal members are attached to the main loop. In the preferred embodiment shown an internal arch is attached to the lower portion of each primary loop (10). The two primary loops (10) are arranged in parallel and connected by connecting struts (12) to form a rigid three-dimensional rollcage frame.

A sidecar wheel (22) is connected to one side of the rollcage frame by an outside attachment member (14) at a point forward of the line formed by rear elongated mounting member L (21) when it is attached to the primary loops (10) as described in detail below. Details of the composition of one embodiment for an outside attachment member for sidecar wheel are shown in FIG. 4 and described in detail below.

A bicycle (24) is connected to the rollcage frame on the other side by an accessory rear mounting frame (18) and four elongated mounting members (16, 17, 20 +21), which may be comprised of rolled or drawn steel or any other material with the rigidity and strength to support the rollcage frame. One end and a point the length of a connecting strut (12) from that end of front elongated mounting member L (17) are attached to the primary loops (10), by means of sleeves for attachment (60— shown in detail in FIG. 5a). The other end of front elongated mounting member L (17) extends out from the rollcage frame to the bicycle (24) where it is attached to the down tube by means of a sleeve for attachment (60—shown in detail in FIG. 5a). One end of front elongated mounting member U (16) is attached to front elongated mounting member L (17) between the primary loops (10), by means of a sleeve for attachment (60—shown in detail in FIG. 5a). The other end of front elongated mounting member U (16) is attached to the top tube of the bicycle (24) by means of a sleeve for attachment (60—shown in detail in FIG. 5a). As an alternative, front elongated mounting member U (16) could be attached to the head tube of the bicycle (24). One end and a point the length of a connecting strut (12) from that end of rear elongated mounting member L (21) are attached to the primary loops (10), by means of sleeves for attachment (60—shown in detail in FIG. 5a). The other end of rear elongated mounting member L (21) is attached to a bored flange on the accessory rear mounting frame (18) near its attachment to the rear axle of the bicycle (24). One end of rear elongated mounting member U (20) is attached to rear elongated mounting member L (21) between the primary loops (10), by means of a sleeve for attachment (60—shown in detail in FIG. 5a). The other end of rear elongated mounting member U (20) extends out and is attached to a second bored flange on the accessory rear mounting frame (18) located nearer to its attachment to the seat post of the bicycle (24). One end of the accessory rear mounting frame (18) is attached to the bicycle (24) at the axle by means of a notch or notches which slide over the axle (the standard axle of the bicycle may need to be replaced with a longer axle to facilitate this attachment) outside the frame of the bicycle (24). The other end of the accessory rear mounting frame (18) is attached to the seat post or seal tube of the bicycle (24) by means of a sleeve for attachment (60—shown in detail in FIG. 5a).

Figure 4:
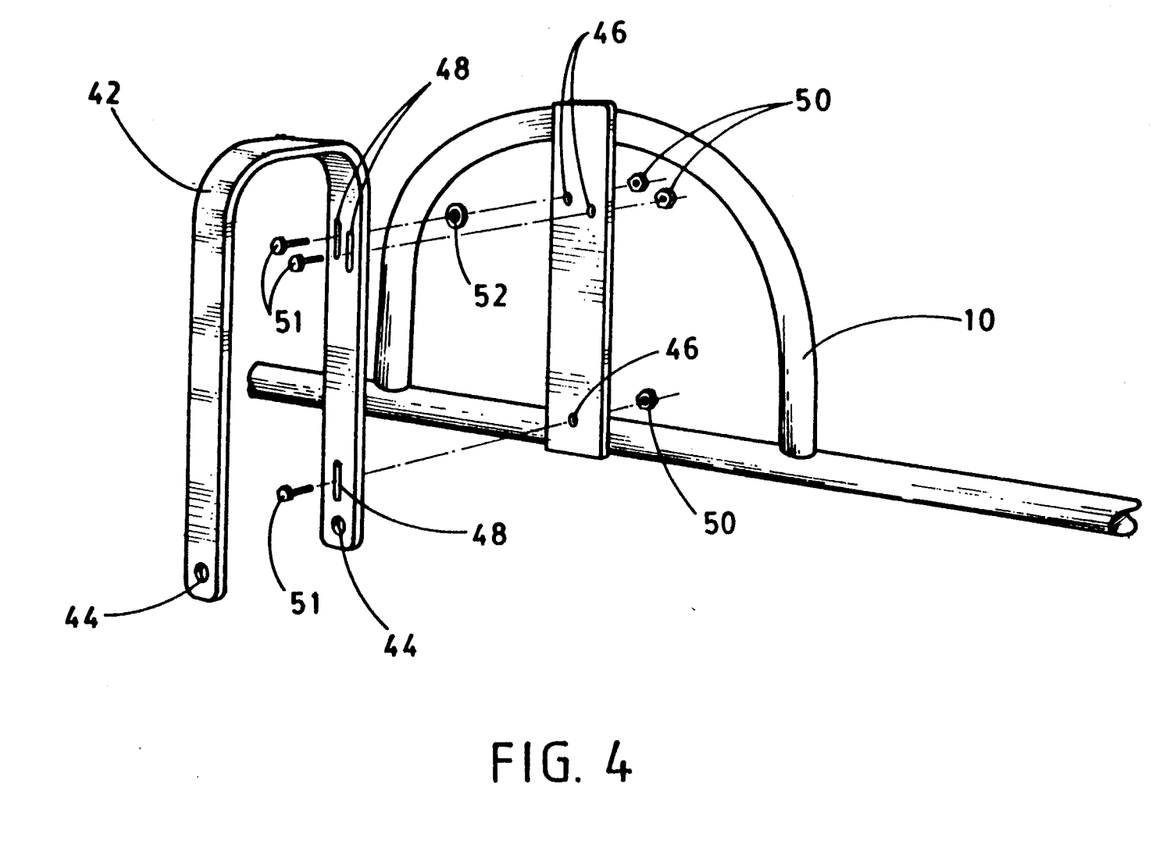
FIG. 4 is a detail of one embodiment of the outside attachment member showing adjustments for setting the vertical height and toe-in and toe-out of the sidecar wheel.

One embodiment of outside attachment member for sidecar wheel (14) is detailed in FIG. 4. In this embodiment outside attachment member (14) is comprised of two metal plates (40 and 42). Welded support (40) is a flat metal plate permanently attached to the rollcage frame (by welding in the embodiment shown where the frame is made of metal). In any embodiment this attachment point must be located forward of the line formed by rear elongated mounting member L (21) when it is attached to the primary loops (10) as described in detail above. Welded support (40) has three holes for attachment (46) which match three vertical slots for attachment and vertical adjustment (48) in wheel support yoke (42). Bolts (51) pass through slots for attachment and vertical adjustment (48) and holes for attachment (46) to nuts (50) which are tightened to secure wheel support yoke (42) to welded support (40). The vertical alignment of wheel support yoke (42) can be adjusted before nuts (50) are tightened. A washer for toe-in/toe-out adjustment (52) can be inserted on either the forward or rear top bolt (51) between wheel support yoke (42) and welded support (40) to provide toe-in or toe-out for the sidecar wheel (22) as necessary. Wheel support yoke (42) is a flat metal strip bent into a tall, narrow "U" shape which fits over sidecar wheel (22). Wheel support yoke (42) has two holes for axle of sidecar wheel (44), one located at each end. The axle of sidecar wheel (22) passes through the holes for axle of sidecar wheel (44) to connect sidecar wheel (22) to the invention.

Figure 5:
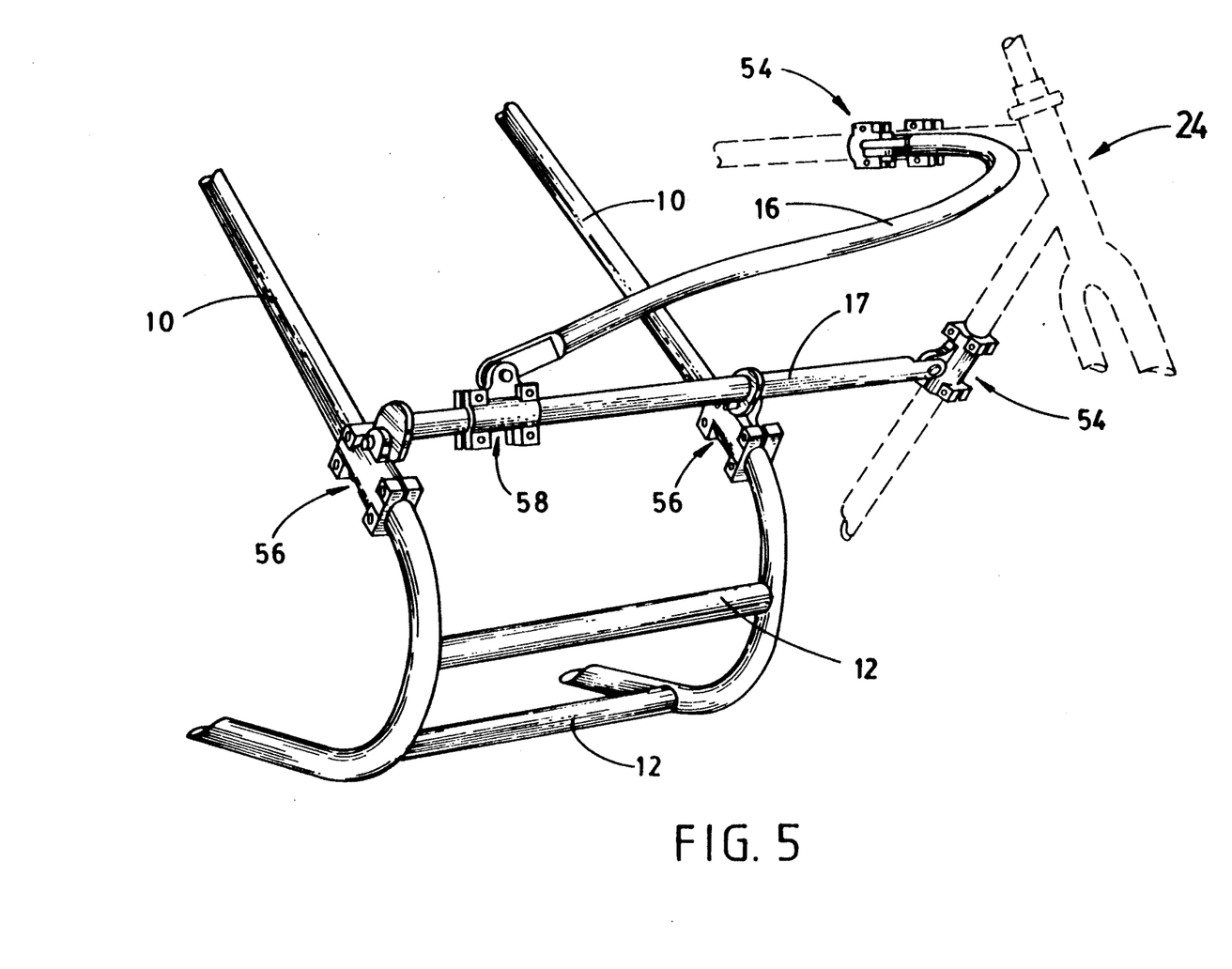
FIG. 5 is a detail of one embodiment of the front elongated mounting members showing adjustments for fitting the invention to various bicycle frame sizes.
Figure 5A:
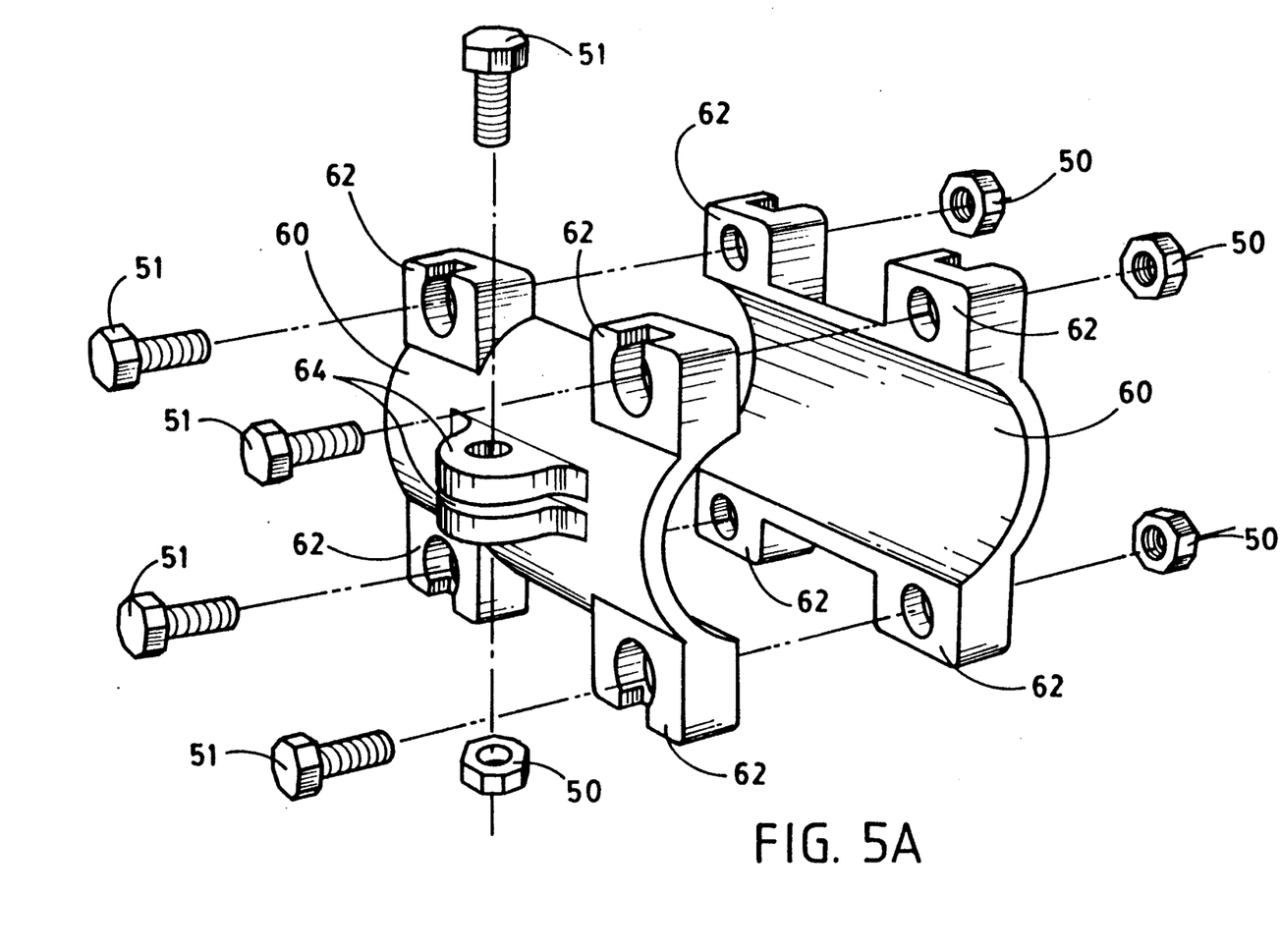
FIG. 5a is a detail of a sleeve for attachment, one form of attachment which could be used in connecting the front and rear elongated mounting members between the accessory rear mounting frame and the bicycle on the one hand and the rollcage frame of the invention on the other hand.

Sleeves for attachment (60) as shown in FIG. 5a are one method which can be used to secure elongated mounting members (16, 17, 20+21) to primary loops (10), to the bicycle (24) and to each other (16 to 17, and 20 to 21), and to secure the accessory rear mounting frame (18) to the seat post or seat tube of the bicycle (24). In the preferred embodiment shown the sleeves for attachment (60) are comprised of split segments of tubing with bored flanges for connecting opposing separate segments of sleeve attachment (62) which bored flanges (62) are permanently attached to each split segment of tubing and aligned so that when the opposing segments of the sleeve for attachment (60) are assembled, the holes in the bored flanges (62) line up so that bolts (51) can be passed through matching bored flanges (62) which are permanently attached to the opposing segments of the sleeve for attachment (60). Nuts (50) can then be screwed onto the bolts (51) to secure the opposing segments together to form sleeves for attachment (60). Two bored flanges (64) are permanently attached to each sleeve for attachment (60). These bored flanges (64) may be located anywhere on the outer surface of the sleeve for attachment (60); however, they must be aligned in parallel such that a bolt (51) may pass through the bores of both bored flanges (64) at the same time. They must also be aligned so that a bored flange permanently attached to an elongated mounting member (16, 17, 20+21) or to the seat post attachment strut (66) may slide between the two bored flanges (64) with its bore aligned with theirs. The bolt (51) should then pass through all three bores at the same time to be secured by a nut (50) to form a pivot at the connection of the elongated mounting member (16, 17, 20 or 21) or seat post attachment strut (66) to the sleeve for attachment (60).

FIG. 5 shows the front elongated mounting members (16 and 17) for connecting the rollcage frame to a bicycle (24). A bored flange is permanently attached (by welding if metal tubing is used) to one end of front elongated mounting member L (17), extending at right angles from front elongated mounting member L (17). A second bored flange is permanently attached to front elongated mounting member L (17) the length of a connecting strut (12) along its length from that end. The second bored flange is aligned parallel with the first and at the same position around the circumference of the tubing or other material of which front elongated mounting member L (17) is comprised. Each bored flange fits between bored flanges (64) which are permanently attached to a sleeve for attachment to primary loops (56, a variation of 60) and is secured there by a bolt (51) and nut (50). The separate segments of each sleeve for attachment to primary loops (56) are placed around the tubing of one of the primary loops (10) and secured there by means of bolts (51) passing through bored flanges (62) and screwing into nuts (50). The extended end of front elongated mounting member L (17) is permanently attached (by welding if metal tubing is used) to a bored flange extending along the axis of front elongated mounting member L (17). This bored flange fits between bored flanges (64) which are permanently attached to a sleeve for attachment to bicycle (54, a variation of 60) and is secured there by a bolt (51) and nut (50). The opposing separate segments of the sleeve for attachment to bicycle (54) are placed around the down tube of the bicycle (24) and secured there by means of bolts (51) passing through bored flanges (62) and screwing into nuts (50). In this preferred embodiment front elongated mounting member U (16) is comprised of tubing bent into a sort of "P" shape so that its opposite ends are at right angles, one aligned along and extending to the lower end of the vertical of the "P" and the other abutting the upper end of that vertical. Each end of front elongated mounting member U (16) is permanently attached (by welding if metal tubing is used) to a bored flange extending along the axis of front elongated mounting member U (16). The bored flange at the end of front elongated mounting member U (16) which abutted the upper end of the vertical of an imaginary "P" fits between bored flanges (64) which are permanently attached to a sleeve for attachment to bicycle (54, a variation of 60) and is secured there by a bolt (51) and nut (50). The separate segments of the sleeve for attachment to bicycle (54) are placed around the top tube of the bicycle (24) and secured there by means of bolts (51) passing through bored flanges (62) and screwing into nuts (50). The bored flange at the other end of front elongated mounting member U (16) fits between bored flanges (64) which are permanently attached to a sleeve for attachment to elongated mounting members (58, a variation of 60) and is secured there by a bolt (51) and nut (50). The separate segments of the sleeve for attachment to elongated mounting members (58) are placed around front elongated mounting member L (17) between the two bored flanges by which it is connected to the primary loops (10) and secured there by means of bolts (51) passing through bored flanges (62) and screwing into nuts (50).

Figure 6:
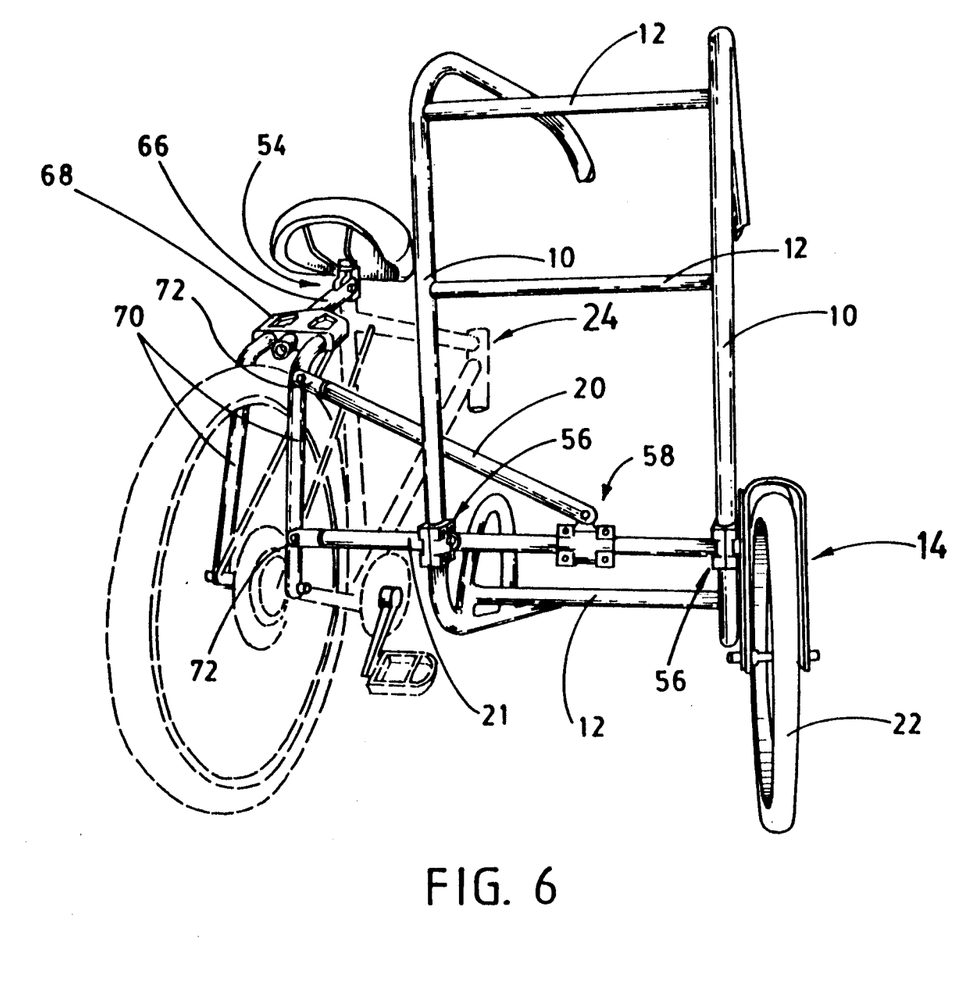
FIG. 6 is a detail of the accessory rear mounting frame and rear attachment members, in one preferred embodiment, showing adjustments for fitting the invention to various bicycle frame sizes.

FIG. 6 shows one preferred embodiment for an accessory rear mounting frame (18) for connecting the rollcage frame to a bicycle (24) via elongated mounting members (20+21). A seat post attachment strut (66) is comprised of tubing or pipe with a bored flange permanently attached (by welding if metal tubing or pipe is used) to one end and extending along the axis of the seat post attachment strut (66). That bored flange fits between bored flanges (64) which are permanently attached to a sleeve for attachment to bicycle (54, a variation of 60) and is secured there by a bolt (51) and nut (50). The separate segments of the sleeve for attachment to bicycle (54) are placed around the seat tube of the bicycle (24) and secured there by means of bolts (51) passing through bored flanges (62) and screwing into nuts (50). The opposite end of the seat post attachment strut (66) is clamped between an upper attachment plate of the seat post attachment strut clamp (68) which is shaped something like an arrowhead with the tip pointed at the seat post and one flat surface up, and a lower attachment clamp which clamps are secured together by four bolts tightened into nuts, two on either side of the seat post attachment strut (66). Two axle attachments struts (70) are permanently attached (by welding if metal tubing is used) to the upper attachment plate of the seat post attachment strut clamp (68). The permanently attached end of each axle attachment strut (70) is aligned along each "cutting edge" of the arrowhead shaped upper attachment plate of the seat post attachment strut (68). The opposite ends of the axle attachment struts (70) run parallel to each other. Each is curved into an "L" shape so that the free end of each axle attachment strut (70) is at right angles to the end that is permanently attached to the upper attachment plate of the seat post attachment strut clamp (68). The free end of each axle attachment strut (70) is permanently attached to a notched attachment to fit over the axle of the wheel of the bicycle (24), outside of the bicycle frame (requiring the use of a special, longer, axle on the bicycle wheel). A bored flange is permanently attached (by welding if metal tubing is used) to one end of rear elongated mounting member L (21), extending at right angles from rear elongated mounting member L (21). A second bored flange is permanently attached to rear elongated mounting member L (21) the length of a connecting strut (12) along its length from that end. The second bored flange is aligned parallel with the first and at the same position around the circumference of the tubing or other material of which rear elongated mounting member L (21) is comprised. Each bored flange fits between bored flanges (64) which are permanently attached to a sleeve for attachment to primary loops (56, a variation of 60) and is secured there by a bolt (51) and nut (50). The separate segments of each sleeve for attachment to primary loops (56) are placed around the tubing of one of the primary loops (10) and secured there by means of bolts (51) passing through bored flanges (62) and screwing into nuts (50). The extended end of rear elongated mounting member L (21) is permanently attached (by welding if metal tubing is used) to a bored flange extending along the axis of rear elongated mounting member L (21). This bored flange is bolted to a bored flange which is permanently attached to the lower end of the axle attachment strut (70) which attaches to the axle on the side of the bicycle (24) nearest to the rollcage frame. Rear elongated mounting member U (20) is comprised of a straight piece of rolled or drawn steel tubing, or other suitable material. Each end of rear elongated mounting member U (20) is permanently attached (by welding if metal tubing is used) to a bored flange extending along the axis of rear elongated mounting member U (20). The bored flange at one end of rear elongated mounting member U (20) is bolted to a bored flange which is permanently attached part way up from the lower end of the axle attachment strut (70) which attaches to the axle on the side of the bicycle (24) nearest to the frame. The bored flange at the other end of rear elongated mounting member U (20) fits between bored flanges (64) which are permanently attached to a sleeve for attachment to elongated mounting member (58, a variation of 60) and is secured there by a bolt (51) and nut (50). The separate segments of the sleeve for attachment to elongated mounting member (58) are placed around rear elongated mounting member L (17) between the two bored flanges by which it is connected to the primary loops (10) and secured there by means of bolts (51) passing through bored flanges (62) and screwing into nuts (50).

Figure 3:
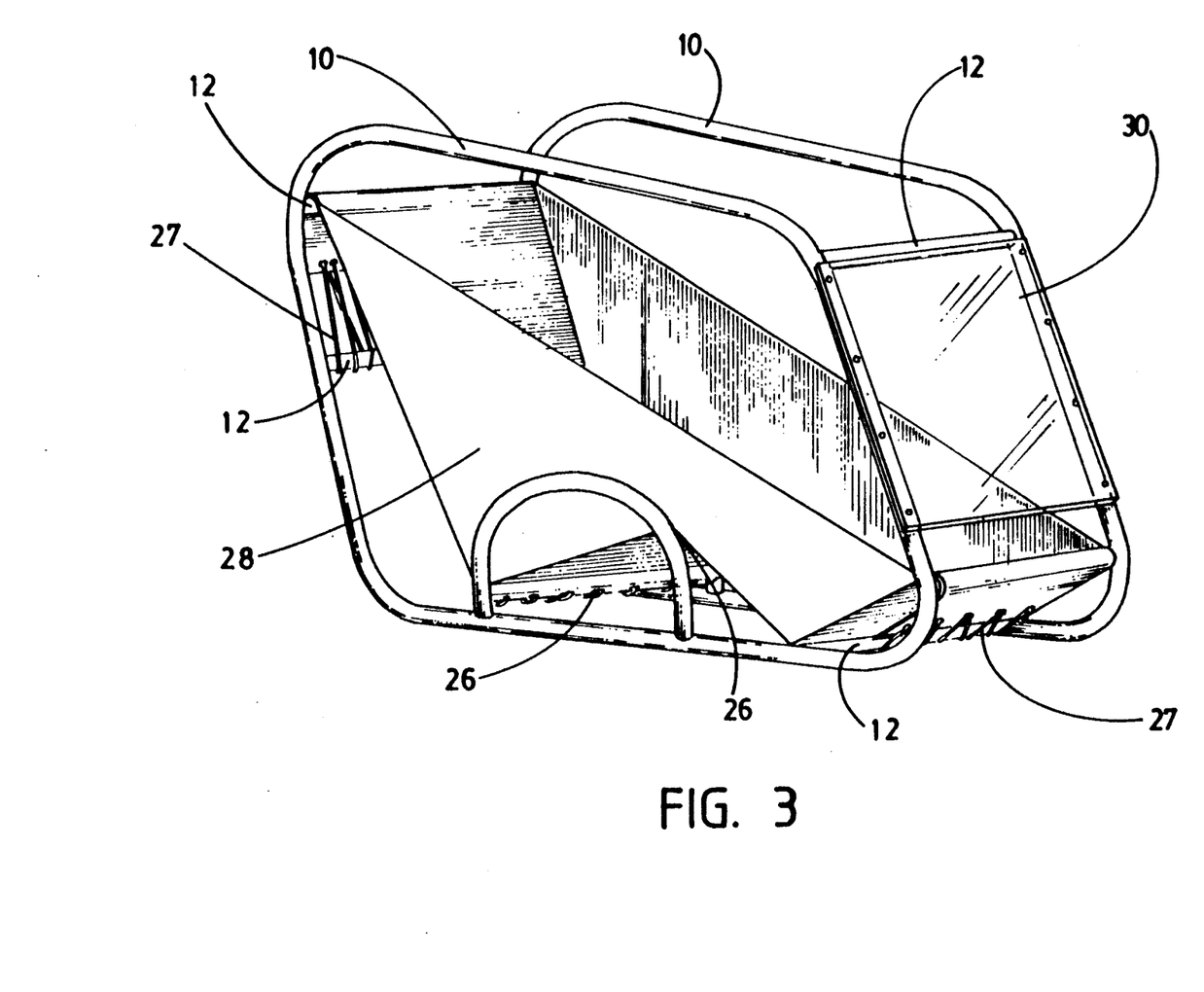
FIG. 3 is a side perspective of the rollcage frame of the invention, without the accessory rear mounting frame or elongated mounting members, but with the rigidly-laced fabric child carrier and protective windshield of one preferred embodiment.

FIG. 3 shows the rollcage frame in one preferred embodiment, equipped with basic supporting/protective devices for carrying a child. As can be seen, in this configuration, the frame functions as a rollcage protecting the load inside. The load carrying device (28) of this preferred embodiment consists of a sewn fabric seat, fitted so that it may be attached by lacing (26) to connecting struts (12). In this preferred embodiment connecting struts (12) are positioned between the primary loops (10) to provide support at the upper and lower ends of load carrying device (28) and at the points where the child's seat, knees and heels rest within load carrying device (28). At each of those points grommets are provided for lacing. As a result, the child is seated on a taut surface with some spring. This seating arrangement avoids the problem of road shock, associated with rigid child seats, and the problem of cramping associated with sling seats. The load carrying device (28) is roomy enough to accommodate padding for smaller passengers but has been demonstrated to be amply proportioned to accommodate a person of up to 130 pounds, thus indicating that it may be extremely useful in applications for handicapped or elderly individuals as well as children. In this preferred embodiment the load carrying device (28) is equipped with standard child seat belts (not shown). A protective windscreen (30) is attached to the primary loops (10) by means of screws.

OPERATION OF INVENTION

The sidecar is useful for carrying various loads, including passengers, once it has been attached to the bicycle, and the rider has practiced the specialized riding techniques needed to maneuver a bicycle with a sidecar.

The first step in preparing to use the sidecar is to attach rear attachment member (18) to the bicycle (24). The axle of the bicycle (24) should be removed and replaced with a longer axle to accommodate the added width of the notched lower ends of the axle attachment struts (70). The opposing segments of a sleeve for attachment to bicycle (54) are placed around the seat post or top of the seat tube of the bicycle (24) and secured there by means of bolts (51) and nuts (50) passed through matching bored flanges (62) and tightened. The sleeve for attachment to bicycle (54) should be aligned so that the bored flanges (64) extend toward the rear before the bolts (51) and nuts (50) are tightened. The bored flange which is permanently attached to the seat post attachment strut (66) should then be inserted between the bored flanges (64) and secured there with a bolt (51) and nut (50). The notched lower ends of the axle attachment struts (70) should be seated on the extensions of the longer axle, outside the frame of the bicycle (24) and secured by the standard method for securing that axle. The axle attachment strut (70) with permanently attached bored flanges (72) should be placed on the side of the bicycle (24) to which the rollcage frame will be attached (in the preferred embodiment, the right side). Prior to securing the axle, the axle attachment struts (70) should be rotated so that the ends which are seated on the axle extensions are approximately vertical. This should bring the upper attachment plate of the seat post attachment strut clamp (68) over the backward extending end of the seat post attachment strut (66). The upper attachment plate of the seat post attachment strut clamp (68) can then be tightened to the lower attachment clamp forming a supplementary frame which will distribute the stress of load carrying more evenly over the wheel and prevent the added stress from damaging the frame of bicycle (24) which may not have been designed for this application.

To attach the sidecar, the rollcage frame (consisting of the primary loops (10) connected by the connecting struts (12)) should be set on a low box next to the bicycle (24), with one primary loop (10) adjacent and parallel to the bicycle (24), and with the primary loop (10) to which the welded support of outside attachment member for sidecar wheel (40) is permanently mounted away from and parallel to the bicycle (24). The height of the box may need to be adjusted up or down during the initial installation steps.

The bored flange that is permanently attached to the end of rear elongated mounting member L (21) and aligned on the axis of that member should then be attached to the lower of the two bored flanges (72) which are permanently attached to the axle attachment strut (70) which is on the side of the bicycle (24) nearest the sidecar. Rear elongated mounting member L (21) should be aligned so that the bored flanges which are permanently attached at right angles to the member are pointing to the rear. The attachment is made by means of a bolt (51) and nut (50). At this point these should not be tightened, but left free so that rear elongated mounting member L (21) can pivot. The frame should then be positioned closer or further from bicycle (24) as necessary so that the bored flanges which are permanently attached to rear elongated mounting member L (21) and at right angles to its axis are aligned with the primary loops (10). Rear elongated mounting member L (21) should be positioned inside the frame. Two sleeves for attachment to primary loops (56) should be attached to the primary loops (10) at the points where the bored flanges attached at right angles to rear elongated mounting member L (21) contact the primary loops (10). The opposing segments of the sleeves for attachment to primary loops (56) should be placed around the tubing of the primary loops (10) so that the bored flanges (62) are lined up, and secured by bolts (51) and nuts (50). Once the opposing segments are connected, the sleeves for attachment to primary loops (56) should be moved up and down and around the primary loops (10) as necessary so that the bored flanges permanently attached at right angles to rear elongated mounting member L (21) slide between the bored flanges (64) located on each sleeve for attachment to primary loops (56). The bolts (51) and nuts (50) connecting the opposing sides of the sleeves for attachment to primary loops (56) can then be tightened securely. Bolts (51) and nuts (50) should then be inserted to secure the bored flanges permanently attached to rear elongated mounting member L (21) to the sleeves for attachment to primary loops (56), which should be adjusted to that elongated mounting member L (21) is kept level. These bolts (51) and nuts (50) should not be tightened down at this point, so that the frame can pivot around rear elongated mounting member L (21).

Front elongated mounting member L (17) should now be installed. The opposing sides of a sleeve for attachment to bicycle (54) are placed around the down tube of the bicycle (24) and secured there by means of bolts (51) and nuts (50) passed through matching bored flanges (62). The sleeve for attachment to bicycle (54) should be aligned so that the bored flanges (64) extend toward the sidecar. The bored flange permanently attached to the end of front elongated mounting member L (17) and aligned along its axis should be inserted between those bored flanges (64) and secured there with a bolt (51) and nut (50). At this point none of these bolts (51) and nuts (50) should be tightened. They should be left free so that the sleeve for attachment to bicycle (54) can slide along the down tube of the bicycle (24) and front elongated mounting member L (17) can pivot. The frame should then be positioned as necessary so that the bored flanges which are permanently attached to front elongated mounting member L (17) and at right angles to its axis are aligned with the primary loops (10). This is accomplished by rotating the rollcage frame around the pivots where rear elongated mounting member L (21) is connected to the two sleeves for attachment to primary loops (56) and by sliding the sleeve for attachment to bicycle (54) to which front elongated mounting member L (17) is attached up or down the down tube of the bicycle (24). Front elongated mounting member L (17) should be positioned outside the rollcage frame. Two sleeves for attachment to primary loops (56) should be attached to the primary loops (10) at the points where the bored flanges attached at right angles to front elongated mounting member L (17) contact the primary loops (10). The opposing segments of the sleeves for attachment to primary loops (56) should be placed around the tubing of the primary loops (10) so that the bored flanges (62) are lined up, and secured by bolts (51) and nuts (50). Once the opposing segments are connected, the sleeves for attachment to primary loops (56) should be moved up and down and around the primary loops (10) as necessary so that the bored flanges permanently attached at right angles to front elongated mounting member L (17) slide between the bored flanges (64) located on each sleeve for attachment to primary loops (56). The bolts (51) and nuts (50) connecting the opposing segments of the sleeves for attachment to primary loops (56) can then be tightened securely. Bolts (51) and nuts (50) should then be inserted to secure the bored flanges permanently attached to front elongated mounting member L (17) to the sleeves for attachment to primary loops (56). These bolts (51) and nuts (50) and those attaching rear elongated mounting member L (21) to the sleeves for attachment to primary loops (56) can now be tightened.

The sidecar should now be leveled from side to side. This is accomplished by adjusting the height of the box supporting the sidecar, and allowing the sidecar to pivot at the points where front elongated mounting member L (17) is connected to the sleeve for attachment to bicycle (54) and where rear elongated mounting member L (21) is connected to the lower bored flange (72). The bolts (51) and nuts (50) forming these pivots should not be tightened even after the sidecar is leveled.

The sidecar wheel (22) should now be mounted. First the wheel support yoke (42) should be secured to the welded support (40) which is permanently attached to the primary loop which is furthest away from the bicycle (24). This is done by aligning the slots for attachment and vertical adjustment (48) with the holes for attachment (46) and securing them with bolts (51) and nuts (50). These bolts (51) and nuts (50) should not be tightened at this point. The washer for toe-in/toe out adjustment (52) is not needed at this point. Once the wheel support yoke (42) is affixed to the welded support (40) the sidecar wheel (22) should be positioned under the wheel support yoke (42) and the sidecar wheel axle inserted through the holes for axle of sidecar wheel (44) and the sidecar wheel (22) itself. The vertical alignment of the sidecar wheel (44) can now be adjusted. This is done by sliding the wheel support yoke (42) up and down along the slots for attachment and vertical adjustment (48) until the wheel is supported in a position where it just touches the ground. The bolts (51) and nuts (50) connecting the wheel support yoke (42) to the welded support (40) can now be tightened.

The next step is to install rear elongated mounting member U (20) and front elongated mounting member U (16). One of the bored flanges that are permanently attached to the end of rear elongated mounting member U (20) and aligned on the axis of that strut should be attached the upper of the two bored flanges (72) which are permanently attached to the axle attachment strut (70) which is on the side of the bicycle (24) nearest the rollcage frame. The attachment is made by means of a bolt (51) and nut (50). At this point these should not be tightened, but left free so that rear elongated mounting member U (20) can pivot. Rear elongated mounting member U (20) should be positioned inside the frame. A sleeve for attachment to elongated mounting member (58) should be attached to rear elongated mounting member L (21) at the point between the primary loops (10) where the bored flange permanently attached at the free end of rear elongated mounting member U (20) contacts rear elongated mounting member L (21). The opposing segments of the sleeve for attachment to elongated mounting member (58) should be placed around the tubing of rear elongated mounting member L (21) so that the bored flanges (62) are lined up, and secured by bolts (51) and nuts (50). Once the opposing segments are connected, the sleeve for attachment to attachment member (58) should be moved along and around rear elongated mounting member L (21) as necessary so that the bored flange permanently attached along the axis of rear elongated mounting member U (20) slides between the bored flanges (64) located on the sleeve for attachment to elongated mounting member (58). The bolts (51) and nuts (50) connecting the opposing segments of the sleeve for attachment to elongated mounting member (58) should not be tightened at this point. A bolts (51) and nut (50) should be inserted to secure the bored flange permanently attached along the axis of rear elongated mounting member U (20) to the sleeve for attachment to elongated mounting member (58). This bolt (51) and nut (50) should also not be tightened down at this point. Front elongated mounting member U (16) should now be installed. The opposing segments of a sleeve for attachment to bicycle (54) are placed around the top tube of the bicycle (24) and secured there by means of bolts (51) and nuts (50) passed through matching bored flanges (62). The sleeve for attachment to bicycle (54) should be aligned so that the bored flanges (64) extend toward the rollcage frame. The bored flange permanently attached to the end of front elongated mounting member U (16) at the end that would abut the vertical of a "P" shape if the member were aligned with it should be inserted between those bored flanges (64) and secured there with a bolt (51) and nut (50). At this point none of these bolts (51) and nuts (50) should be tightened. They should be left free so that the sleeve for attachment to bicycle (54) can slide along and around the top tube of the bicycle (24) and front elongated mounting member U (16) can pivot where it is attached to bored flanges (64). The opposite end of front elongated mounting member U (16) should now be aligned so that it touches front elongated mounting member L (17) between the primary loops (10). This is accomplished by rotating front elongated mounting member U (16) around the pivot where it is connected to the bored flanges (64) on the sleeve for attachment to bicycle (54) and by sliding that sleeve for attachment to bicycle (54) along the top tube of the bicycle (24). Once the proper alignment is achieved, a sleeve for attachment to elongated mounting member (58) should be attached to front elongated mounting member L (17) at the point where the end of front elongated mounting member U (16) contacts front elongated mounting member L (17). The opposing segments of the sleeve for attachment to elongated mounting member (58) should be placed around the tubing of front elongated mounting member L (17) so that the bored flanges (62) are lined up, and secured by bolts (51) and nuts (50). Once the opposing segments are connected, the sleeve for attachment to attachment member (58) should be moved back and forth and around front elongated mounting member L (17) as necessary so that the bored flange permanently attached along the axis of front elongated mounting member U (16) can slide between the bored flanges (64) located on the sleeve for attachment to elongated mounting member (58). The bolts (51) and nuts (50) connecting the opposing sides of the sleeve for attachment to elongated mounting member (58) should not be tightened at this point. A bolt (51) and nut (50) should then be inserted to secure the bored flange permanently attached along the axis of front elongated mounting member U (16) to the sleeve for attachment to elongated mounting member (58). This bolt (51) and nut (50) should also not be tightened at this point. The box which has been supporting the sidecar can be removed at this point as it is no longer needed.

The bicycle (24) angle should now be adjusted. Standing in front of the bicycle (24) it should appear as a vertical line, perpendicular to the ground. The top of the bicycle (24) should now be moved toward the rollcage frame one inch, so that the line of the bicycle (24) as viewed from the front, now angles in toward the top of the rollcage frame. This is accomplished by sliding the sleeves for attachment to elongated mounting members (58) to which front elongated mounting member U (16) and rear elongated mounting member U (21) are attached along front elongated mounting member L (17) and rear elongated mounting member L (20) respectively. At the same time the structure will pivot at the points where rear elongated mounting member L (20) is connected to lower bored flange (72) of axle attachment strut (70), where rear elongated mounting member U (21) is connected to upper bored flange (72) of axle attachment strut (70), and where front elongated mounting member L (17) is connected to the sleeve for attachment to bicycle (54) attached to the down tube of bicycle (24). And the sleeve for attachment to bicycle (54) attached to the top tube of the bicycle (24) and connected to front elongated mounting member U (16) will rotate around the top tube of the bicycle (24). Once the angle of the bicycle has been set correctly the bolts (51) and nuts (50) securing all of the sleeves for attachment (60) and all of the bored flange to bored flange connections at all of these angles should be tightened securely.

Supporting and protective devices as desired can be attached to the sidecar at this point. In the preferred embodiment shown in FIG. 3, a seat for carrying a child would be laced in now. The upper back of the carrying support is laced (26) to the top rear connecting strut (12). The seam where the back and seat of the carrying support is laced (26) to the connecting strut (12) that runs between the internal arches of the primary loops (10), toward the back of the rollcage frame. The seam that runs across the carrying support at the point where a rider's knees would bend is laced (26) to the connecting strut (12) that runs between the internal arches of the primary loops (10), toward the front of the rollcage frame. The seam that runs across the carrying support at the point where a rider's heels would touch the support is laced (27): under the bottom most connecting strut (12), over the connecting strut (12) that connects the primary loops (10) just below where front elongated mounting member L (17) is attached to the sleeves for attachment to primary loops (56), and to the bottom edge of the carrying support. As pressure is applied to this final lacing (27) the carrying support will be drawn taut to provide a comfortable, springy seat. A protective windscreen (30) can be screwed to the primary loops between upper front connecting strut (12) the point where front elongated mounting member L (17) is attached to the sleeves for attachment to primary loops (56).

It is now time to practice special riding techniques for sidecars and to adjust the toe-in/toe-out of the sidecar wheel (24). First a weight simulating an average load should attached to the sidecar (25 pounds would be suitable). The rider should then ride in a straight line, on a level surface, at an average riding speed (10 to 12 mph would be suitable). The rider should note whether the bicycle (24) tends to pull to the right or to the left as his or her hands are lifted, briefly, from the handle bars. If the bicycle (24) pulls to the left, the washer for toe-in/toe-out adjustment (52) should be inserted between the wheel support yoke (42) and the welded support (40) around the forwardmost of the top connecting bolts (51) and nuts (50). If the bicycle (24) pulls to the right, the washer for toe-in/toe-out adjustment (52) should be inserted between the wheel support yoke (42) and the welded support (40) around the backwardmost of the top connecting bolts (51) and nuts (50).

Once the toe-in/toe-out adjustment is complete, the rider should practice riding the bicycle (24) with the sidecar. The rider will find that the assembly is more stable and has better handling characteristics, making it safer to ride, when loaded than when unloaded. However, there are certain unique characteristics to the rigid bicycle-and-sidecar assembly that the rider needs to be aware of. Because the sidecar is rigidly attached to the bicycle (24) the rider cannot lean into turns with the bicycle (24) but must lean with his or her body alone into the turn. The sidecar wheel (22) is positioned to create a high resistance to pitch poling without excessive negative impact on handling; however, if the rider attempts to make a sharp left turn at high speed the assembly could pitch pole to the right. If the sidecar wheel (22) slips off a curb the sidecar and rider will be thrown to the right. If the rider attempts to make a sharp right turn at high speed, particularly with a light or no load in the sidecar, the assembly will tend to tip over to the left (where there is no support from the sidecar to prevent a fall). With a little practice the rider will become used to riding the assembly and should experience little difficulty. No rider should carry a child or any other passenger until the rider is experienced riding that assembly, and unless the passenger is equipped with a helmet.

CONCLUSION AND SCOPE OF INVENTION

Thus the reader will see that the sidecar of the invention provides an ideal method for carrying loads with a bicycle, especially passengers. The design of the invention maximizes the load carrying capacity of the invention in a way that increases the safety, stability and handling characteristics of the assembly as the weight of the load increases, i.e. by combining a side attachment with a rollcage frame design. The rigid structure of the whole also makes this invention useful as a holding device even when the bicycle is not being ridden. And the attachment configuration of the preferred embodiment shown allows complete freedom to pedal the bicycle, flexibility to adjust to various sizes of bicycles, and protects the frame of the bicycle from damage from the added stresses of having a load attached to its side through the use of an accessory rear mounting frame. In the preferred embodiment shown the design of the primary loops and connecting struts of the rollcage frame also maximizes the efficiency and cost effectiveness of the manufacturing process.

While the above description contains many specifications, these should not be construed as limitations on the scope of the invention, but rather as an exemplification of one preferred embodiment thereof. Many other variations are possible.

The tubing of the sidecar could be of many materials including PVC piping, rolled or drawn steel, aluminium, etc. The configuration of the primary loops is almost infinitely variable as is the placement of the connecting struts. Even the safety features of the surrounding rollcage design of the preferred embodiment might prove unnecessary in some applications. The accessory rear mounting frame need not be as complex as the device shown in FIG. 6, but could be as simple as a bent tube extending from the seat post or seat tube of the bicycle to the rear axle outside of the bicycle frame on the side to which the rollcage frame is attached. Front elongated mounting member L may be bowed as shown in FIG. 5, or angled, or formed of several interconnected pieces in numerous configurations for providing clearance for pedaling the bicycle.

The connections for attaching the parts of the sidecar and for attaching the sidecar to the bicycle can be of any material and structure which will allow the necessary attachments. For instance, the sleeves for attachment could be configured from nylon straps or bands as well as split tubing. The bolts and nuts could be replaced with "quick release" devices to allow the sidecar to be removed from the bicycle with ease for transport or storage. The toe-in/toe-out adjustment can be made with shims clamped between the wheel support yoke and the welded support of the outside attachment member for sidecar wheel. The sidecar could be permanently attached to a bicycle so that no special attachment mechanisms, or sizing adjustments, are needed at all. Or the sidecar could be built to size eliminating the need for sizing adjustments, but retaining the attachment/detachment option.

An even greater number of variations of load carrying supports and protective devices are imaginable. The simple seating device shown in FIG. 3 could be enhanced with a roof and side windows. Attachments could be provided for carrying specialized loads such as a spare wheel. Generalized pouches for carrying loads of various sizes and fragility could easily be designed. Padding could be added to carrying supports or to frame members where they protrude, or where they are susceptible to wear.

Accordingly, the scope of the invention should be determined not by the embodiments illustrated, but by the appended claims and their legal equivalents.

The inventor claims:

1. A load carrying device for attaching rigidly to a side of a bicycle which bicycle has a seat post, head, top, down and seat tubes, chain and seat stays, and a rear axle, comprising:
   an accessory rear mounting frame extending from the seat post or seat tube of said bicycle to the rear axle of said bicycle,
   a structure for supporting a load with a wheel attached to one side at a point that, after said load carrying device is attached to said bicycle, is located forward of a line formed by extending the rear axle of said bicycle,
   a plurality of elongated mounting members,
   said elongated mounting members being rigidly connected between said accessory rear mounting frame and said bicycle on the one hand and said structure for supporting a load on the other hand; whereby said elongated mounting members can be connected between said structure for supporting a load and said accessory rear mounting frame far enough to the rear of said seat post or seat tube to allow space to pedal said bicycle while the stress of moving said structure for supporting a load is transferred by said accessory rear mounting frame to the seat tube of said bicycle so that the chain and seat stays of said bicycle will not be warped or broken.

2. The device of claim 1 wherein an elongated mounting member extending from said structure for supporting a load to the top or head or down tube of said bicycle is bowed or angled; whereby adequate space is created for pedaling said bicycle.

3. The device of claim 1 wherein one end of said accessory rear mounting frame is split so that said accessory rear mounting frame extends from the seat post or seat tube of said bicycle, straddles the rear wheel of said bicycle, and attaches to both ends of the rear axle of said bicycle; whereby the stress of moving said structure for supporting a load is transferred more evenly by said accessory rear mounting frame to the seat tube of said bicycle.

4. The device of claim 1 wherein said structure for supporting a load is comprised of a rigid structural framework which can support a load so that said load can be carried without a separate containment element; whereby the overall weight of the invention is reduced and its load carrying capacity correspondingly increased.

5. The device of claim 4 wherein said rigid structural framework surrounds said load; whereby said rigid structural framework can serve as a rollcage to protect said load in the event of an accident.

6. The device of claim 4 wherein a sewn fabric protective or supporting device or devices are tautly laced to said rigid structural framework to provide support tailored to specific loads, including but not limited to a child seat.

7. The device of claim 4 wherein a protective or supporting device or devices are permanently attached to said rigid structural framework to provide protection or support for specific loads, including but not limited to a windscreen.

8. The device of claim 4 wherein a protective or supporting device or devices are suspended from said rigid structural framework to provide protection or support for specific loads.

9. A load carrying device for attaching rigidly to a side of a bicycle which bicycle has a seat post, head, top, down and seat tubes, chain and seat stays, and a rear axle, comprising:

an accessory rear mounting frame extending from the seat post or seat tube of said bicycle to the rear axle of said bicycle, a structure for supporting a load with a wheel attached to one side at a point that, after said load carrying device is attached to said bicycle, is located forward of a line formed by extending the rear axle of said bicycle, a bowed or angled front mounting member, a plurality of additional elongated mounting members, said bowed or angled front mounting member and said elongated mounting members being rigidly connected between said accessory rear mounting frame and said bicycle on the one hand and said structure for supporting a load on the other hand; whereby said bowed or angled front mounting member can be connected between said structure for supporting a load and the top or head or down tube of said bicycle to allow space to pedal said bicycle, and whereby said elongated mounting members can be connected between said structure for supporting a load and said accessory rear mounting frame far enough to the rear of said seat post or seat tube to allow space to pedal said bicycle while the stress of moving said structure for supporting a load is transferred by said accessory rear mounting frame to the seat tube of said bicycle so that the chain and seat stays of said bicycle will not be warped or broken.

10. The device of claim 9 wherein one end of said accessory rear mounting frame is split so that said accessory rear mounting frame extends from the seat post or seat tube of said bicycle, straddles the rear wheel of said bicycle, and attaches to both ends of the rear axle of said bicycle; whereby the stress of moving said structure for supporting a load is transferred more evenly by said accessory rear mounting frame to the seat tube of said bicycle.

11. The device of claim 9 wherein said structure for supporting a load is comprised of a rigid structural framework which can support a load so that said load can be carried without a separate containment element; whereby the overall weight of the invention is reduced and its load carrying capacity correspondingly increased.

12. The device of claim 11 wherein said rigid structural framework surrounds said load; whereby said rigid structural framework can serve as a rollcage to protect said load in the event of an accident.

13. The device of claim 11 wherein a sewn fabric protective or supporting device or devices are tautly laced to said rigid structural framework to provide support tailored to specific loads, including but not limited to a child seat.

14. The device of claim 11 wherein a protective or supporting device or devices are permanently attached to said rigid structural framework to provide protection or support for specific loads, including but not limited to a windscreen.

15. The device of claim 11 wherein a protective or supporting device or devices are suspended from said rigid structural framework to provide protection or support for specific loads.

* * * * *